United States Patent
An (10) Patent No.: US 9,713,113 B2
(45) Date of Patent: Jul. 18, 2017

(54) METHOD AND APPARATUS FOR CONTROLLING PRE-REGISTRATION OF TERMINAL IN WIRELESS COMMUNICATION SYSTEM

(71) Applicant: Samsung Electronics Co., Ltd., Suwon-si, Gyeonggi-do (KR)

(72) Inventor: Eunju An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/652,338

(22) PCT Filed: Jan. 8, 2014

(86) PCT No.: PCT/KR2014/000171
§ 371 (c)(1),
(2) Date: Jun. 15, 2015

(87) PCT Pub. No.: WO2014/109529
PCT Pub. Date: Jul. 17, 2014

(65) Prior Publication Data
US 2015/0341887 A1    Nov. 26, 2015

(30) Foreign Application Priority Data
Jan. 8, 2013  (KR) .................. 10-2013-0001863

(51) Int. Cl.
*H04W 60/04* (2009.01)
*H04W 76/02* (2009.01)
(Continued)

(52) U.S. Cl.
CPC ......... *H04W 60/04* (2013.01); *H04W 76/021* (2013.01); *H04W 8/04* (2013.01); *H04W 88/08* (2013.01)

(58) Field of Classification Search
CPC ....... H04W 4/02; H04W 60/00; H04W 60/04; H04W 92/02
(Continued)

(56) References Cited

U.S. PATENT DOCUMENTS

2009/0207805 A1   8/2009   Zou
2011/0194530 A1   8/2011   Tinnakornsrisuphap et al.
(Continued)

FOREIGN PATENT DOCUMENTS

KR       10-0933760 B1      12/2009
KR    10-2010-0015711 A      2/2010
(Continued)

*Primary Examiner* — Sam Bhattacharya
(74) *Attorney, Agent, or Firm* — Jefferson IP Law, LLP (57) ABSTRACT

Provided is a method for a base station of an asynchronous wireless communication system placed in an area where subnets of a synchronous wireless communication system overlap each other to control pre-registration of a user equipment with the synchronous wireless communication system. The method may include: determining, by at least one base station placed in the area where subnets overlap each other, a virtual subnet ID to be used and transmitting the virtual subnet ID to a user equipment; receiving a call setup request message from the user equipment; and transmitting the call setup request message and subnet ID information corresponding to the actual location of the base station to a Mobility Management Entity (MME).

12 Claims, 8 Drawing Sheets

(51) Int. Cl.
*H04W 88/08* (2009.01)
*H04W 8/04* (2009.01)

(58) Field of Classification Search
USPC ............ 455/422.1, 435.1, 509; 370/331, 332
See application file for complete search history.

(56) References Cited

U.S. PATENT DOCUMENTS

| | | |
|---|---|---|
| 2011/0263242 A1 | 10/2011 | Tinnakornsrisuphap et al. |
| 2012/0051328 A1 | 3/2012 | Swaminathan et al. |
| 2012/0064934 A1 | 3/2012 | Jang et al. |

FOREIGN PATENT DOCUMENTS

| | | |
|---|---|---|
| KR | 10-2012-0040162 A | 4/2012 |
| KR | 10-2012-0055671 A | 5/2012 |
| KR | 10-1127708 B1 | 6/2012 |

METHOD AND APPARATUS FOR CONTROLLING PRE-REGISTRATION OF TERMINAL IN WIRELESS COMMUNICATION SYSTEM

TECHNICAL FIELD

The present invention relates to a wireless communication system and, more particularly, to a method and apparatus for controlling a user equipment frequently performing pre-registration with a synchronous network in a wireless communication system where synchronous and asynchronous networks coexist.

BACKGROUND ART

Typical mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

Meanwhile, when a data service provider attempts to change HRPD (High Rate Packet Data) based network technology into LTE (Long Term Evolution) based network technology, interworking between the HRPD network and the LTE network is needed in the whole service area of the data service provider until LTE system deployment is completed.

A network operator may permit an eAT (eVolved Access Terminal which supports both HRPD and LTE and may be used interchangeably with a user equipment (UE)) to use an LTE-based service in an area where the LTE network is available and to use an HRPD-based service when LTE service quality is degraded or an LTE signal is unavailable.

For interworking with LTE, the HRPD system provides an eHRPD (evolved HRPD) functionality. The eHRPD functionality has the following merits.

A service available in LTE is made available in both CDMA and LTE by use of CDMA air resources and the LTE core.

Call setup delay is reduced because repetition of interface operation performed with the LTE core at the initial setup time (PPP session setup, subscriber authentication for billing, or the like) is not required regardless of radio-level handover between CDMA and LTE.

It is possible to reuse resources allocated by the LTE core at the initial setup time (IP, PPP session or the like) regardless of movement between CDMA and LTE.

For data service continuation between LTE and CDMA, a UE remaining in the LTE domain occupies and manages HRPD resources through the LTE wireless network (optimized eHRPD). In the case of HRPD, RAN resources are changed on a subnet basis. To this end, the LTE eNB delivers the subnet ID of the HRPD DO system covering the same area to the UE.

The UE checks the pre-registration zone ID received from the LTE system and, if the value thereof is changed, performs the pre-registration procedure with the target HRPD system.

However, in the event that a UE is placed in an area where multiple HRPD systems overlap each other, whenever a different pre-registration zone ID is received, the UE may have to perform pre-registration with the corresponding HRPD system, repeating unnecessary pre-registration.

DISCLOSURE OF INVENTION

Technical Problem

The present invention has been made in view of the above problems. Accordingly, an aspect of the present invention is to provide a method and apparatus for controlling a user equipment frequently performing pre-registration with a synchronous network in a wireless communication system where synchronous and asynchronous networks coexist.

Solution to Problem

In accordance with an aspect of the present invention, there is provided a method of controlling pre-registration of a user equipment with a synchronous wireless communication system for a base station of an asynchronous wireless communication system that is placed in an area where subnets of the synchronous wireless communication system overlap each other. The method may include: determining, by at least one base station placed in the area where subnets overlap each other, a virtual subnet ID to be used and transmitting the virtual subnet ID to a user equipment; receiving a call setup request message from the user equipment; and transmitting the call setup request message and subnet ID information corresponding to the actual location of the base station to a Mobility Management Entity (MME).

In accordance with another aspect of the present invention, a base station is provided. The base station may include: an interface unit to send and receive signals to and from a user equipment or a node of a wireless communication system; and a control unit to control a process of transmitting a virtual subnet ID, which is to be used by one or more base stations placed in an area where subnets overlap each other, to a user equipment, receiving a call setup request message from the user equipment, and transmitting the call setup request message and subnet ID information corresponding to the actual location of the base station to a Mobility Management Entity (MME).

Advantageous Effects

In a feature of the present invention, it is possible to prevent a user equipment or access terminal from frequently performing pre-registration with a synchronous network in a wireless communication system where synchronous and asynchronous networks coexist. Thereby, unnecessary repetition of a procedure and waste of resources can be avoided.

MODE FOR THE INVENTION

Hereinafter, exemplary embodiments of the present invention are described in detail with reference to the accompanying drawings. The same or similar reference symbols are used throughout the drawings to refer to the same or like parts. Detailed descriptions of well-known functions and structures incorporated herein may be omitted to avoid obscuring the subject matter of the present invention.

Next, a description is given of a method for controlling a user equipment frequently performing pre-registration with a synchronous network in a wireless communication system where synchronous and asynchronous networks coexist. In the following description, the HRPD system is used as a representative synchronous network and the LTE system is used as a representative asynchronous network. However, the subject matter of the present invention is not limited thereto.

Figure 1:
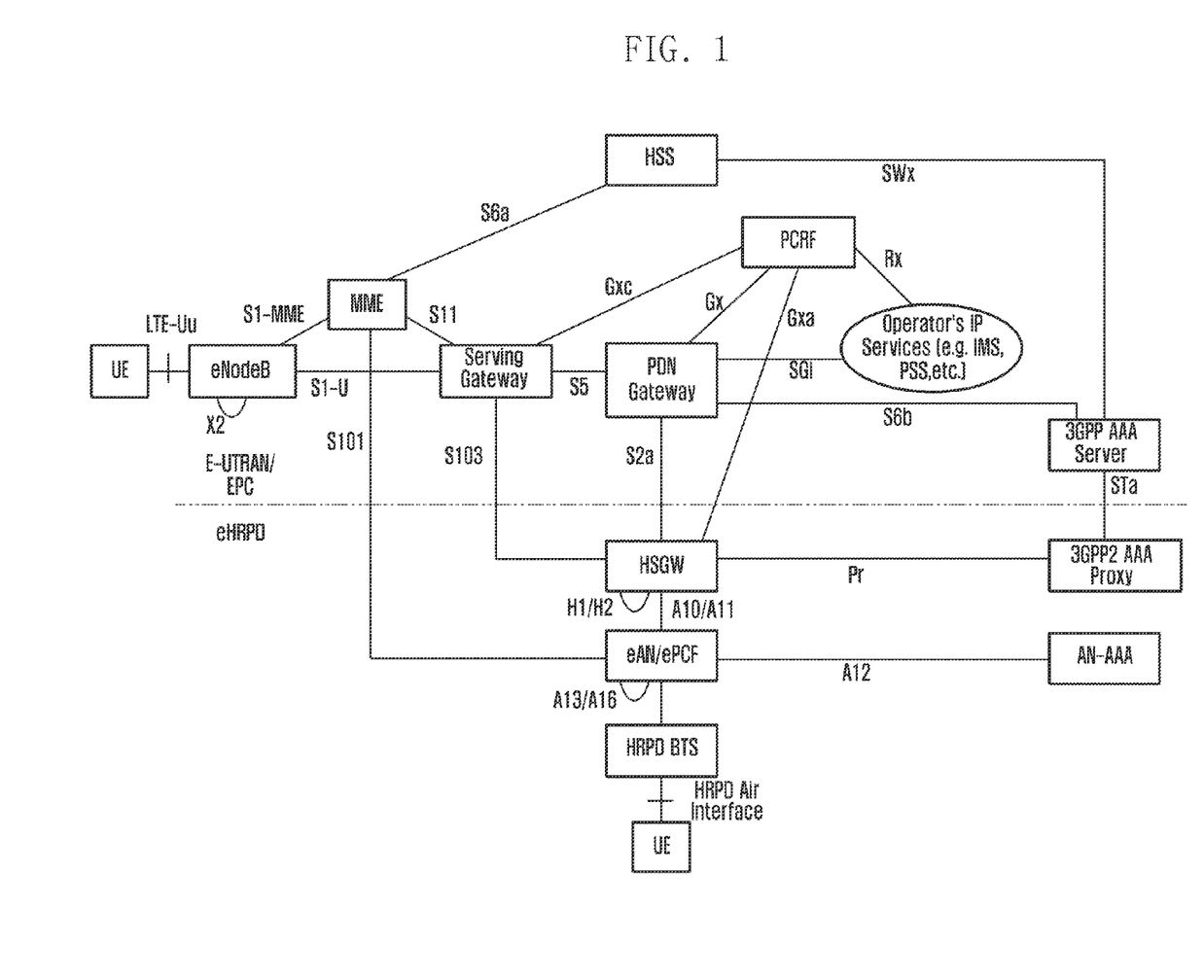
FIG. 1 illustrates a high-level architecture for interworking between an LTE network as an asynchronous network and a CDMA network as a synchronous network, which is applied to an embodiment of the present invention.

FIG. 1 illustrates a high-level architecture for interworking between the LTE network as an asynchronous network and the CDMA network as a synchronous network, which is applied to an embodiment of the present invention.

There are optimized eHRPD interworking and non-optimized eHRPD interworking. As the present invention relates to optimized eHRPD interworking, a description of non-optimized eHRPD interworking is omitted.

In optimized eHRPD interworking, tunneling messages based on the S101 interface (for signaling) and the S103 interface (for bearer traffic) are provided to the UE for handover between E-UTRAN and eHPRD. When the UE remains in the E-UTRAN, it may use tunneling messages to perform pre-registration with the eHRPD system.

Pre-registration may allocate eHRPD resources in advance to the UE remaining in the E-UTRAN, enabling radio-level handoff/handover at the time of hand-down from LTE to CDMA. This is to minimize quality degradation due to handoff/handover from the LTE system to the CDMA system. Pre-registration is described in more detail later with reference to FIG. 2.

In the case of HRPD, RAN resources are changed on a subnet basis. To this end, the LTE eNB delivers the subnet ID of the HRPD DO system covering the same area to the UE as shown in Table 1.

TABLE 1

To provide the optimized eHRPD functionality, the eNodeB of LTE uses an RRC message to transmit the color code (subnet identifier) of an HRPD subnet.
2012 May 5 07:01:42.988 [00] 0xB0C0 LTE RRC OTA Packet --

TABLE 1-continued

DL_DCCH
Pkt Version = 2
RRC Release Number.Major.minor = 9.5.0
Radio Bearer ID = 1, Physical Cell ID = 169
Freq = 4900
SysFrameNum = N/A, SubFrameNum = 0
PDU Number = DL_DCCH Message, Msg Length = 179
...
preRegistrationInfoHRPD
{
preRegistrationAllowed TRUE,
preRegistrationZoneId 10
}
1) preRegistrationInfoHRPD:
parameter applied for interworking between LTE and HRPD
eAT notifies HRPD of pre-registration zone
2) preRegistrationZoneId sent to eAT indicates color code value of HRPD system.

The UE checks the pre-registration zone ID (preRegistrationZoneId) received from the LTE system and, if the value thereof is changed, performs the pre-registration procedure with the new target HRPD system. Upon reception of a pre-registration request from the UE remaining in LTE, the handoff procedure is initiated between the source and target HRPD systems.

Meanwhile, change of HRPD resources between subnets is to be applied from the UE through the CDMA system to the EPC. In particular, when the subnet related to the signal obtained by the UE changes frequently owing to movement of the subscriber or signal variation in an area of subnet boundaries, change of HRPD/EPC resources occurs frequently correspondingly. This may increase system utilization regardless of achieving the purpose of providing seamless data services to the subscribers.

Figure 2:
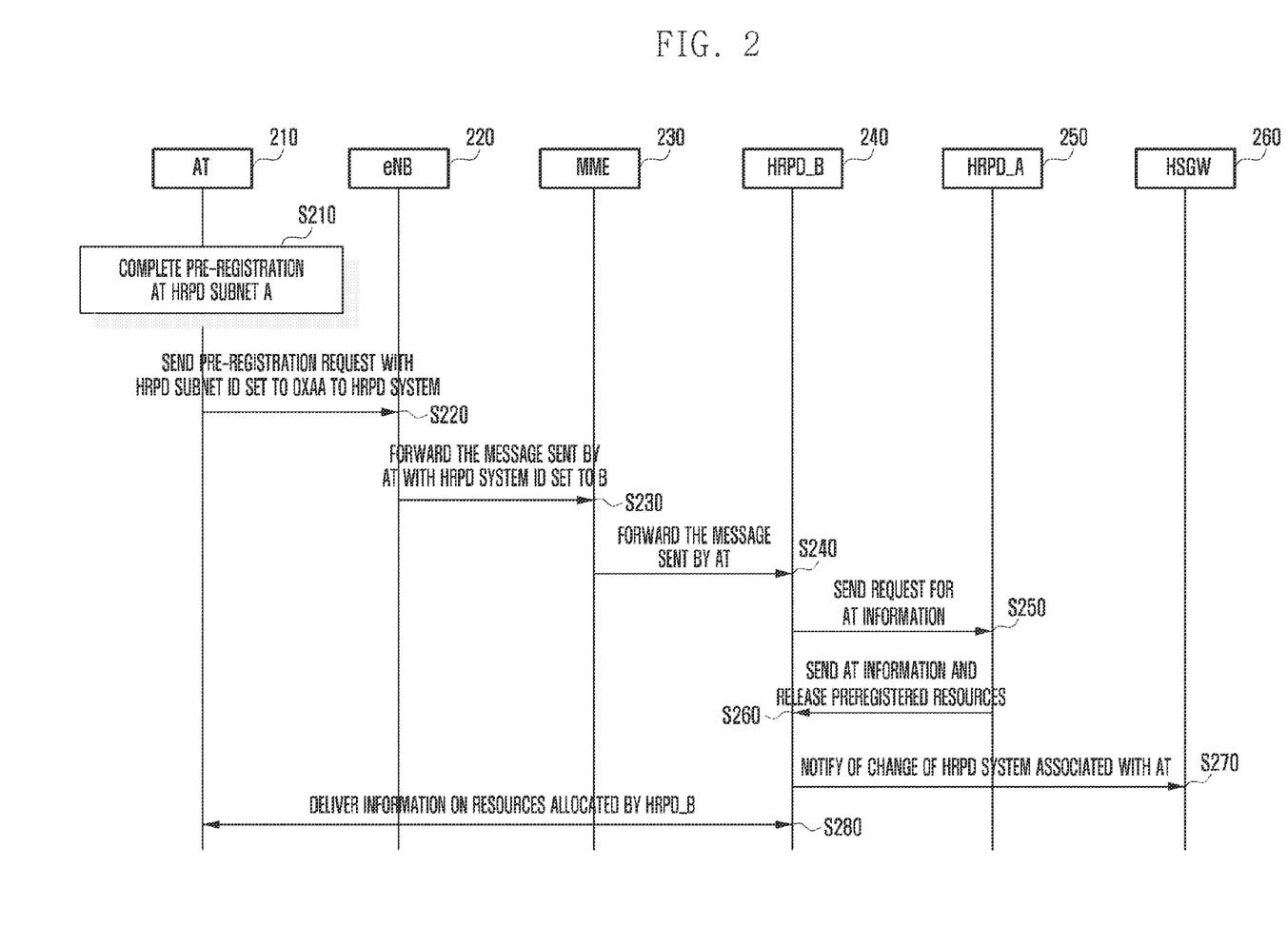
FIG. 2 is a sequence diagram illustrating a pre-registration procedure of a user equipment, which is applied to the present invention.

FIG. 2 is a sequence diagram illustrating a pre-registration procedure of a user equipment, which is applied to the present invention.

At step S210, the AT 210 completes pre-registration at HRPD subnet A. Thereafter, the AT 210 sends a pre-registration request (with HRPD subnet ID set to '0xaa') to the HRPD system. Actually, this request is sent to the eNB 220 placed at subnet B.

At step S220, the eNB 220 forwards the message (with HRPD system ID set to B) received from the AT 210 to the Mobility Management Entity (MME) 230. At step S230, the MME 230 forwards the message sent by the AT 210 to the HRPD_B 240. At step S250, the HRPD_B 240 sends a request for AT information to the HRPD_A 250. At step S260, the HRPD_A 250 sends AT information and removes preregistered resources. At step S270, the HRPD_B 240 notifies the HSGW 260 of change of the HRPD system associated with the AT 210.

At step S280, the HRPD_B 240 sends information on allocated resources to the AT 210, ending the procedure of pre-registration.

Figure 3:
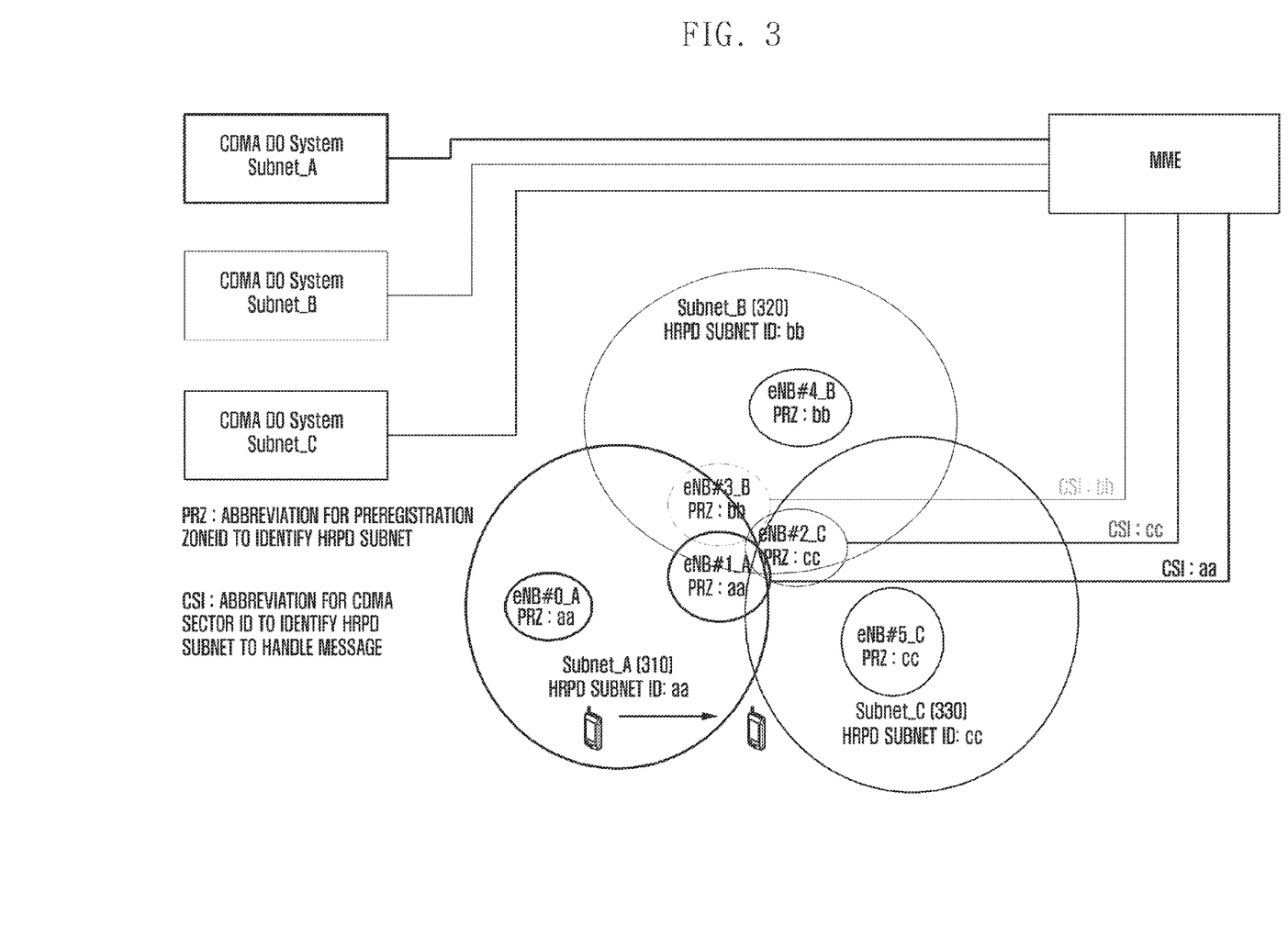
FIG. 3 depicts a situation causing unnecessary initiation of pre-registration in an area where multiple subnets overlap each other.

Next, a description is given of a situation causing unnecessary initiation of pre-registration in an area where multiple subnets overlap each other with reference to FIG. 3.

FIG. 3 depicts a situation causing unnecessary initiation of pre-registration in an area where multiple subnets overlap each other.

Subnet A 310 uses 'aa' as HRPD subnet ID, and LTE eNBs within the coverage of subnet A (e.g. eNB#0_A and eNB#1_A) broadcast (or transmit) 'aa' as subnet ID.

Subnet B 320 uses 'bb' as HRPD subnet ID, and LTE eNBs within the coverage of subnet B (e.g. eNB#3_B and eNB#4_B) broadcast 'bb' as subnet ID.

Subnet C 330 uses 'cc' as HRPD subnet ID, and LTE eNBs within the coverage of subnet C (e.g. eNB#2_C and eNB#5_C) broadcast 'cc' as subnet ID.

In the event that three subnets overlap each other in an area as shown in FIG. 3, while the AT remains in eNodeB regions with different preregistration zone IDs (e.g. eNB#1_A, eNB#2_C, eNB#3_B), a minor change in frequency or location may cause initiation of unnecessary pre-registration among the three subnets.

In the HRPD system, as resource management is performed on a subnet basis, a subnet change causes release and reallocation of resources. However, when the AT receives a service from the LTE system while using the HRPD system as a backup network, it is not required to perform release and reallocation of resources due to CDMA subnet change on a real-time basis.

The present invention has been made in view of the above description. Specifically, the present invention provides a method and apparatus that minimize changes in HRPD resources using the LTE radio network in an area where multiple subnets overlap each other so as to reduce processing at the eAT/LTE/HRPD system/EPC.

To achieve this, one or more eNBs placed in an area where HRPD system subnets overlap each other are configured to transmit the same preregistration zone ID (or subnet ID). That is, one or more eNBs placed in an area where different HRPD subnets overlap each other are configured to transmit the same preRegistrationZoneId.

In this case, as the AT receiving a service from the LTE system is unable to detect occurrence of HRPD subnet change, it does not perform pre-registration due to subnet change.

However, as the eNB is aware of the HRPD subnet serving or covering the region of the eNB, it adds information on the serving HRPD subnet to the CDMA signaling message to be sent to the MME.

Thereafter, when the AT attached to the LTE system performs hand down to the CDMA network of the subnet not pre-registered in the area where HRPD subnets overlap each other, it performs the pre-registration procedure due to subnet change and the call setup procedure together.

Figure 4:
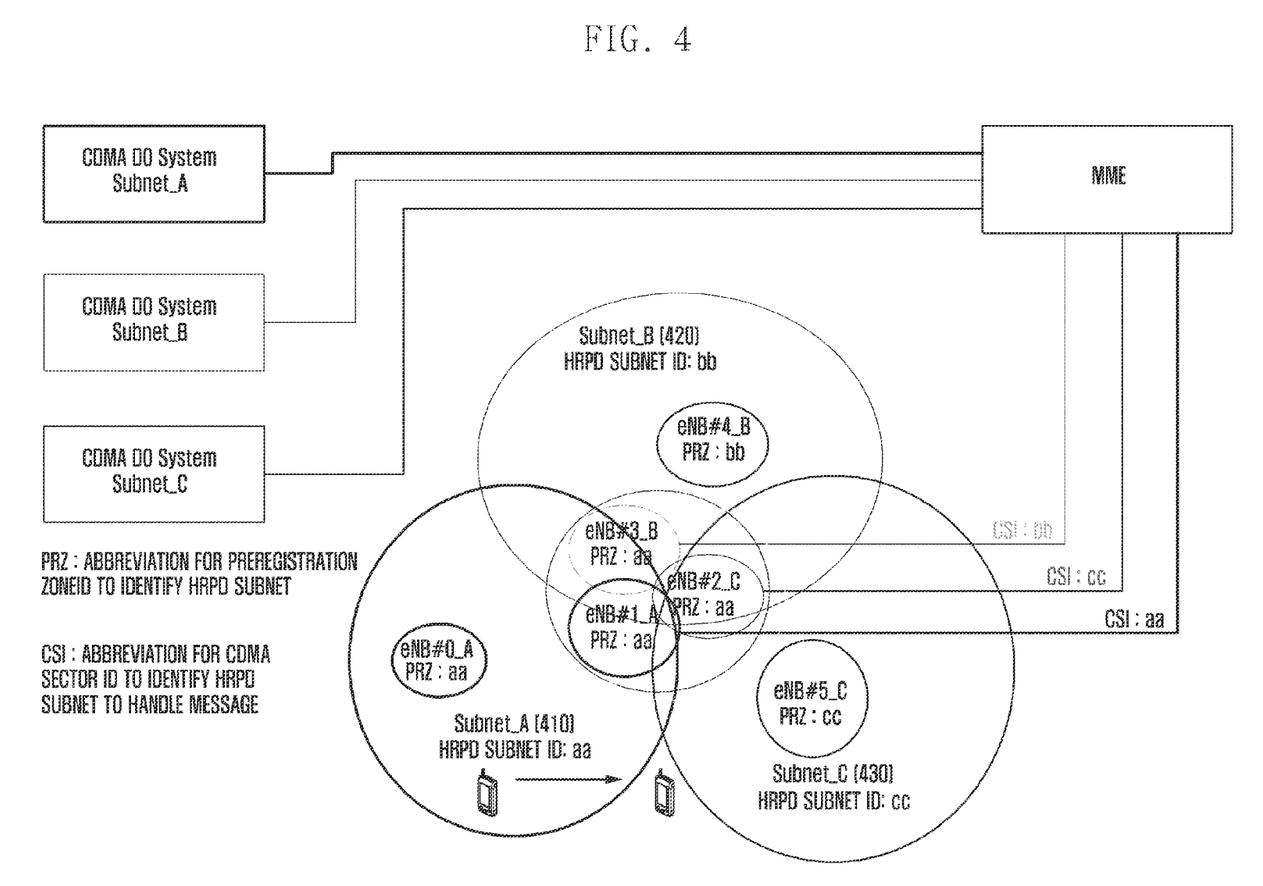
FIG. 4 depicts broadcasting of the same pre-registration zone ID by eNBs located in an area where subnets of the HRPD system overlap each other according to an embodiment of the present invention.

FIG. 4 depicts broadcasting of the same pre-registration zone ID by eNBs located in an area where HRPD system subnets overlap each other according to an embodiment of the present invention.

Subnet A 410 uses 'aa' as HRPD subnet ID, and the LTE eNB within the coverage of subnet A (eNB#0_A) broadcasts 'aa' as subnet ID. According to an embodiment of the present invention, eNB#1_A placed in the area where multiple subnets overlap each other broadcasts 'aa' as virtual subnet ID (here, subnet ID 'aa' is a fictitious ID for illustration and hence any other ID such as 'dd' or 'ee' may be used).

Subnet B 420 uses 'bb' as HRPD subnet ID, and the LTE eNB within the coverage of subnet B (eNB#4_B) broadcasts 'bb' as subnet ID. According to an embodiment of the present invention, eNB#3_B placed in the area where multiple subnets overlap each other broadcasts 'aa' as virtual subnet ID.

Subnet C 430 uses 'cc' as HRPD subnet ID, and the LTE eNB within the coverage of subnet C (eNB#5_C) broadcasts 'cc' as subnet ID. According to an embodiment of the present invention, eNB#2_C placed in the area where multiple subnets overlap each other broadcasts 'aa' as virtual subnet ID.

Consequently, as the AT remaining in the area where multiple subnets overlap each other is unable to detect occurrence of HRPD subnet change, it does not perform pre-registration due to subnet change. Thereby, it is possible to prevent unnecessary pre-registration and waste of resources associated therewith.

As described above, according to one embodiment of the present invention, all eNBs placed in the same area where multiple subnets overlap each other broadcast the same virtual subnet ID to ATs. Here, such a virtual subnet ID may be set by the network operator deploying an eNB or may be set directly by an eNB that autonomously checks whether the eNB is placed in an area where multiple subnets overlap each other.

Figure 5:
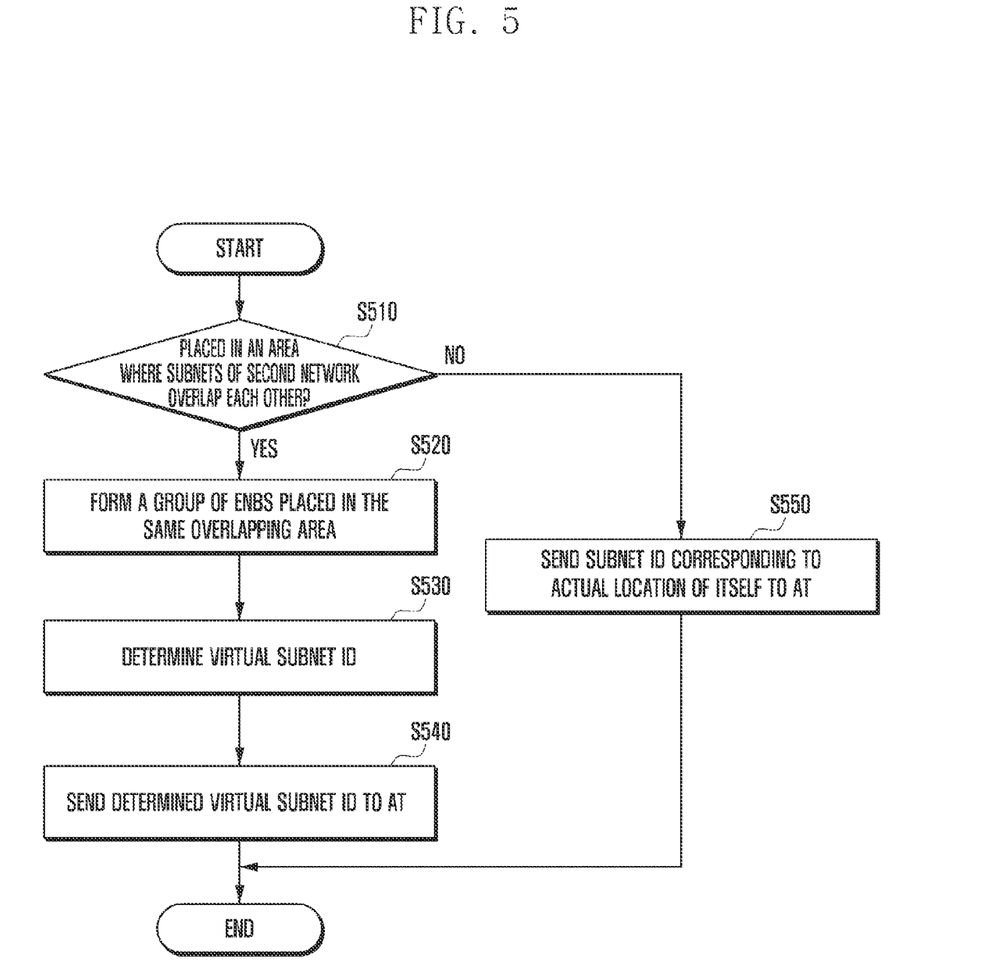
FIG. 5 illustrates a procedure for the eNB to determine whether the eNB is located in an area where multiple subnets overlap each other and determine a virtual subnet ID according to an embodiment of the present invention.

FIG. 5 illustrates a procedure for the eNB to determine whether the eNB is located in an area where multiple subnets overlap each other and determine a virtual subnet ID according to an embodiment of the present invention.

At step S510, the eNB checks whether it is placed in an area where subnets of a second network (i.e. HRPD) overlap each other. If placed in an area where subnets overlap each other, the procedure proceeds to step S520 at which the eNB collects information on other eNBs placed in the area where subnets overlap each other and forms a group of eNBs placed in the same area. In general, as eNBs are interconnected via wired interfaces, the eNBs may share information on locations thereof. Hence, it is possible to form a group of eNBs placed in the same area with overlapping subnets.

At step S530, the eNB determines a virtual subnet ID to be used in the area where subnets overlap each other. The virtual subnet ID is to be sent to the AT and may be a randomly chosen subnet ID.

At step S540, the eNB sends the determined virtual subnet ID to the AT.

If not placed in an area where subnets overlap each other at step S510, the procedure proceeds to step S550 at which the eNB sends a subnet ID corresponding to the actual location thereof to the AT.

Figure 6:
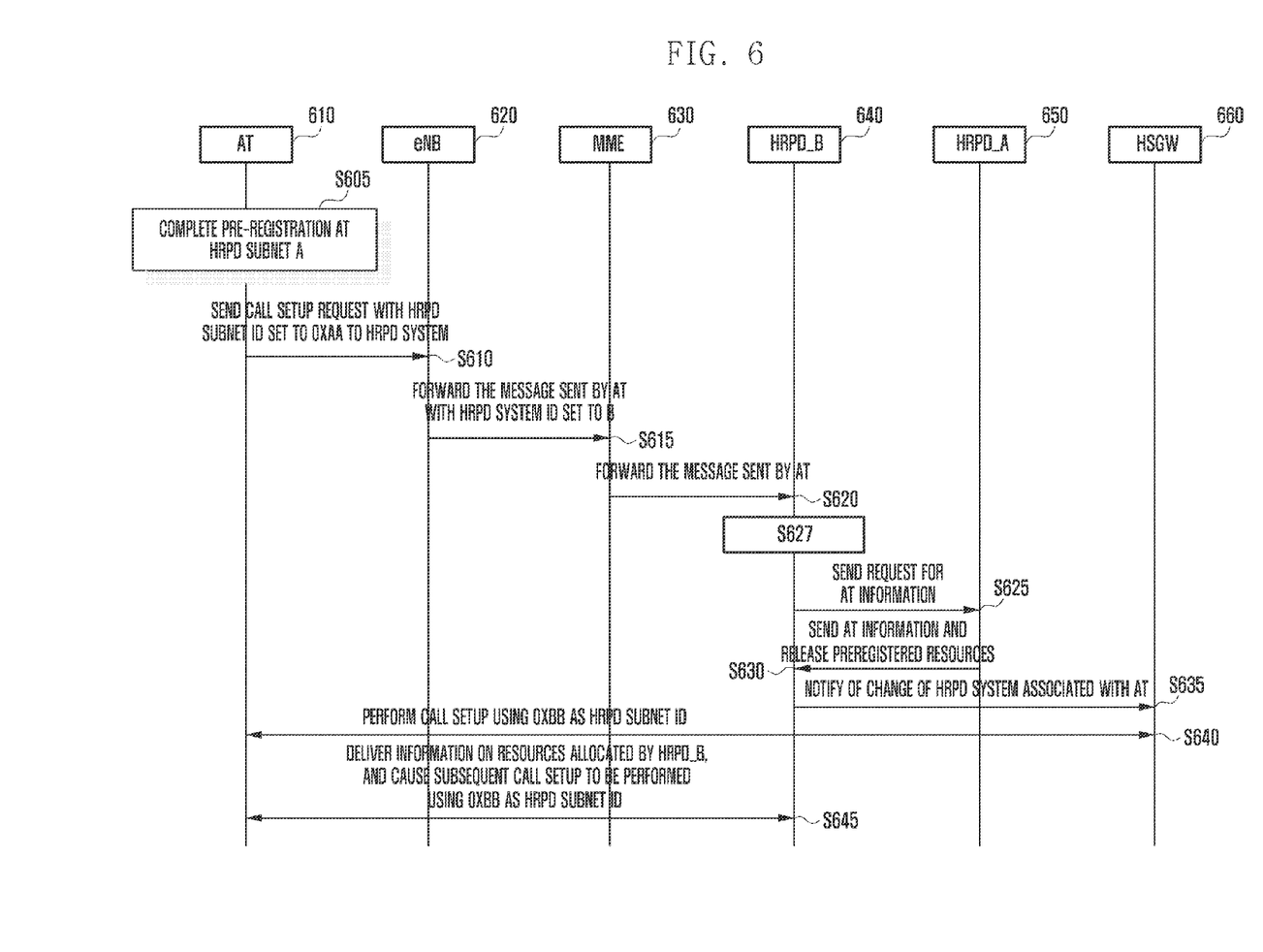
FIG. 6 is a sequence diagram illustrating a procedure for controlling pre-registration of the UE according to an embodiment of the present invention.

FIG. 6 is a sequence diagram illustrating a procedure for controlling pre-registration of the UE according to an embodiment of the present invention.

First, the procedure for controlling pre-registration of the UE or AT may be summarized as follows.

1. Each eNB covering an area where multiple subnets overlap each other sets the preregistration zone ID (subnet ID) to the same value.

Table 2 illustrates a situation where the eNB sends '0xbb' as virtual subnet ID to the AT while the actual HRPD subnet ID is '0xbb'.

TABLE 2

2012 May 5 07:01:42.988 [00] 0xB0C0 LTE RRC OTA Packet --
DL_DCCH
Pkt Version = 2
RRC Release Number.Major.minor = 9.5.0
Radio Bearer ID = 1, Physical Cell ID = 169
Freq = 4900
SysFrameNum = N/A, SubFrameNum = 0
PDU Number = DL_DCCH Message, Msg Length = 179
...
preRegistrationInfoHRPD
{
preRegistrationAllowed TRUE,
preRegistrationZoneId 0xaa
}
1) preRegistrationInfoHRPD:
parameter applied for interworking between LTE and HRPD
eAT notifies HRPD of pre-registration zone.
2) preRegistrationZoneId sent to eAT indicates color code value of
HRPD system.

2. The eNB sends the same virtual preregistration zone ID to the AT while sending CDMA2000 sector ID associated with the actual HRPD subnet to the MME.

3. Upon reception of a connection request message containing a UATI (Unicast Access Terminal Identifier) having a color code not supported by the HRPD system, the eNB receives HRPD information for the corresponding AT from a HRPD system supporting the color code and performs call setup accordingly.

4. During call setup, the HRPD system performing call setup sends a newly allocated UATI via a traffic channel, and hence call setup and pre-registration are simultaneously processed.

On the basis of the above summary, a description is given of the procedure for controlling pre-registration of the AT with reference to FIG. 6.

At step S605, the AT 610 completes pre-registration at HRPD subnet A. At step S610, the AT 610 sends a call setup request message with HRPD subnet ID set to '0xaa' to the HRPD system.

The eNB 620 receives the call setup request message from the AT 610 and forwards the message (with HRPD system ID set to B) sent by the AT 610 to the MME 630. That is, the eNB 620 placed in an area of overlapping subnets sends a HRPD subnet ID set to '0xaa' to the AT but adds HRPD subnet ID associated actual location of the eNB 620 to the message to be sent to the MME 630.

At step S620, the MME 630 forwards the call setup request message sent by the AT 610 to the HRPD_B 640. Then, the HRPD_B 640 performs step S627, which is described in FIG. 7.

Figure 7:
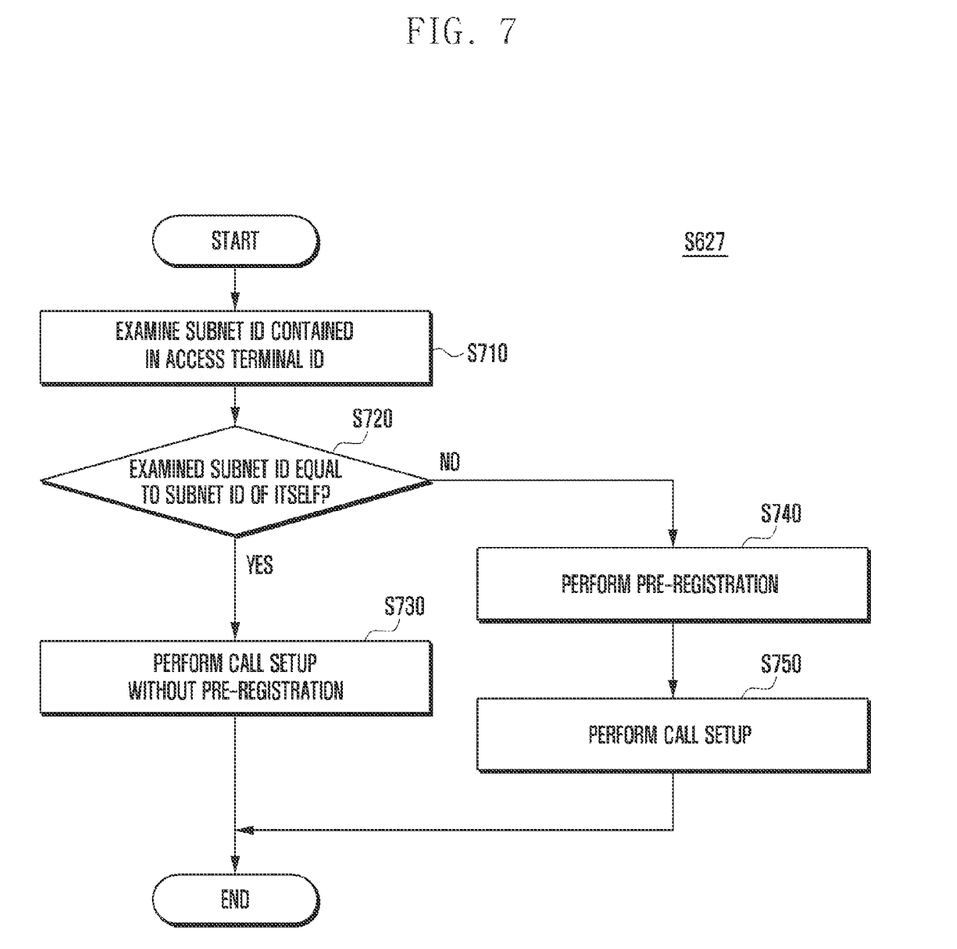
FIG. 7 is a detailed flowchart depicting step S627 of FIG. 6.

Referring to FIG. 7, upon reception of the call setup request message from the AT, at step S710, the HRPD_B 640 examines the subnet ID contained in the access terminal ID of the call setup request message.

At step S720, the HRPD_B 640 checks whether the subnet ID in the call setup request message is equal to the subnet ID of the HRPD_B 640.

If the two subnet IDs are the same, the procedure proceeds to step S730 at which the HRPD_B 640 performs call setup without pre-registration.

If the two subnet IDs are not the same, the procedure proceeds to step S740 at which the HRPD_B 640 performs pre-registration. Thereafter, at step S750, the HRPD_B 640 performs call setup. That is, in response to a call setup request from an AT, when the subnet ID obtained by the AT is not the same as that of the HRPD_B 640, the HRPD_B 640 performs both the pre-registration procedure and the call setup procedure.

The pre-registration procedure at step S740 of FIG. 7 corresponds to steps S625 to S635 of FIG. 6, and the call setup procedure at step S750 of FIG. 7 corresponds to step S640 of FIG. 6.

Referring back to FIG. 6, as described above, the HRPD_B 640 performs the pre-registration procedure at steps S625 to S635, and performs the call setup procedure at step S640.

At step S645, the HRPD_B 640 sends information on resources allocated at the HRPD_B to the AT 610, so that subsequent call setup may proceed using '0xbb' as HRPD subnet ID.

Although not shown in detail in FIG. 6, each node of the wireless communication system may include an interface unit to wiredly or wirelessly communicate with other nodes, and a control unit to process functions designated to the node.

Figure 8:
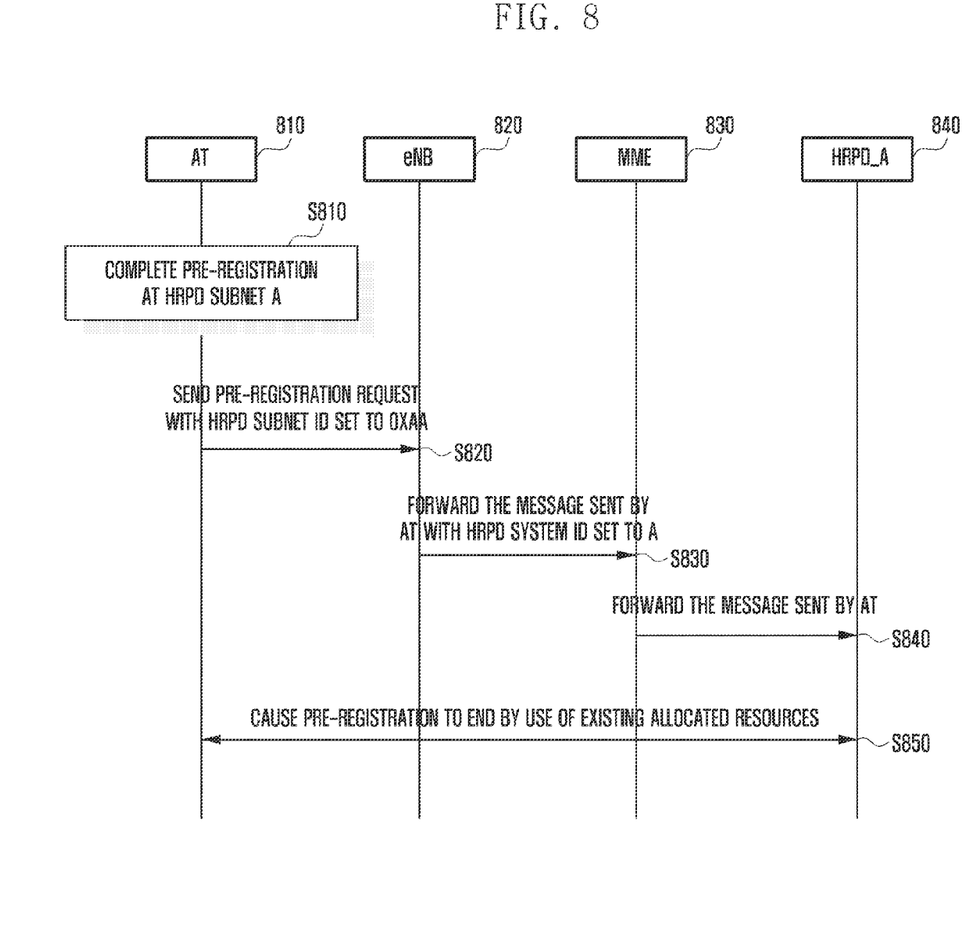
FIG. 8 is a sequence diagram illustrating a procedure for pre-registration of the UE when the eNB is located in an area where multiple subnets overlap each other according to an embodiment of the present invention.

FIG. 8 is a sequence diagram illustrating a procedure for pre-registration of the UE when the eNB is located in an area where multiple subnets overlap each other according to an embodiment of the present invention.

In the case of an eNB placed in an area of overlapping subnets, handling of pre-registration of an AT may be summarized as follows. In response to a pre-registration request containing subnet ID supported by the HRPD system from the AT, existing HRPD system resources are preserved and the pre-registration procedure is ended.

On the basis of the above summary, a description is given of a procedure for controlling pre-registration of an AT with reference to FIG. 8.

At step S810, the AT 810 completes pre-registration at HRPD subnet A. At step S820, the AT 810 sends a pre-registration request message with HRPD subnet ID set to '0xaa' to the eNB 820.

At step S830, the eNB 820 forwards the pre-registration request message (with HRPD system ID set to A) sent by the AT 810 to the MME 230. At step S840, the MME 830 forwards the pre-registration request message sent by the AT 810 to the HRPD_A 840.

Here, as the HRPD subnet ID sent by the AT is equal to the HRPD subnet ID of the HRPD_A 840, the HRPD_A 840 may determine that initiation of pre-registration is not necessary. Hence, at step S850, the HRPD_A 840 may cause the pre-registration procedure to end by use of existing allocated resources.

Next, a description is given of advantageous effects according to the embodiments of the present invention with reference to FIG. 4.

Case 1) eNB#0_A→eNB#1_A→eNB#2_C→eNB#1_A

As the AT remaining in eNB#0_A is pre-registered in the HRPD system supporting subnet A, it has access to HRPD resources allocated to support subnet A.

Although the AT moves through eNB#1_A to eNB#2_C, pre-registration is not initiated unlike the conventional scheme. When the AT moves back to eNB#1_A, pre-registration is not initiated either.

When hand-down to the CDMA network occurs at eNB#1_A, it is possible to use existing HRPD resources to provide a desired data service.

When the AT moves along the path described above, the conventional scheme would cause initiation of pre-registration two times while the scheme of the present invention does not cause initiation of pre-registration.

Case 2) eNB#0_A→eNB#1_A→eNB#2_C

As the AT remaining in eNB#0_A is pre-registered in the HRPD system supporting subnet A, it has access to HRPD resources allocated to support subnet A.

Although the AT moves through eNB#1_A to eNB#2_C and receives an LTE service from eNB#2_C, pre-registration is not initiated.

When the AT on subnet C makes an attempt at CDMA call setup, both pre-registration and call setup are initiated.

Case 3) eNB#4_B→eNB#3_B→eNB#2_A

As the AT remaining in eNB#4_B is pre-registered in the HRPD system supporting subnet B, it has access to HRPD resources allocated to support subnet B.

During movement from eNB#4_B to eNB#3_B, as the preregistration zone ID is changed, the AT makes a pre-registration attempt, and the HRPD system supporting subnet B completes pre-registration with simplified steps through reuse of resources, in comparison to the conventional scheme.

When the AT moves through eNB#3_B to eNB#2_C and attempts to access the CDMA network at eNB#2_C, the HRPD system supporting subnet C receives HRPD information related to the AT from the HRPD system supporting subnet B and performs both pre-registration and call setup.

As described hereinabove, according to the present invention, in a wireless communication system where synchronous and asynchronous networks coexist, it is possible to prevent a user equipment or access terminal from frequently performing pre-registration with the synchronous network. Thereby, unnecessary repetition of a procedure and waste of resources can be avoided.

Hereinabove, embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method of controlling pre-registration of a terminal by a base station, the method comprising:
   determining whether a base station for an asynchronous wireless communication system is placed in an area where subnets of a synchronous wireless communication system overlap each other; and
   transmitting a virtual subnet ID to at least one base station in the area where subnets of the synchronous wireless communication system overlap each other for configuring the virtual subnet ID among the base stations, if the base station is placed in the area.

2. The method of claim 1, further comprising:
   transmitting the virtual subnet ID to a terminal, the virtual subnet ID being determined to be used by at least one base station placed in the area where subnets of the synchronous wireless communication system overlap each other;
   receiving a call setup request message from the terminal; and
   transmitting the call setup request message and actual subnet ID information corresponding to location of the base station to a mobility management entity (MME) which transmits the call setup request message to a synchronous wireless communication system according to the actual subnet ID information.

3. The method of claim 1, wherein whether to initiate pre-registration of the terminal with the synchronous wireless communication system is determined according to a wireless communication system identifier contained in the call setup request message.

4. The method of claim 3, wherein, when the wireless communication system identifier contained in the call setup request message is different from the identifier of a synchronous wireless communication system to which the call setup request message is forwarded by the MME, a pre-registration procedure and call setup procedure are performed in sequence for the terminal.

5. The method of claim 3, wherein, when the wireless communication system identifier contained in the call setup request message is equal to the identifier of a synchronous wireless communication system to which the call setup request message is forwarded by the MME, a call setup procedure is performed for the terminal.

6. The method of claim 1, wherein the asynchronous wireless communication system comprises a Long Term Evolution (LTE) system and the synchronous wireless communication system comprises a High Rate Packet Data (HRPD) system.

7. A base station for controlling pre-registration of a terminal, the base station comprising:
   an interface unit configured to transmit and receive signals to and from a terminal or a node of a wireless communication system; and
   a control unit configured to:
      determine whether a base station for an asynchronous wireless communication system is placed in an area where subnets of a synchronous wireless communication system overlap each other, and
      control the interface unit for transmitting a virtual subnet ID to at least one base station in the area where subnets of the synchronous wireless communication system overlap each other for configuring the virtual subnet ID among the base stations, if the base station is placed in the area.

8. The base station of claim 7, wherein the control unit is further configured to:
   control a process of transmitting a virtual subnet ID to a terminal, the virtual subnet ID being determined to be used by at least one base station placed in the area where subnets of the synchronous wireless communication system overlap each other,
   receive a call setup request message from the terminal, and
   transmit the call setup request message and actual subnet ID information corresponding to location of the base station to a mobility management entity (MME) which transmits the call setup request message to a synchronous wireless communication system according to the actual subnet ID information.

9. The base station of claim 7, wherein whether to initiate pre-registration of the terminal with the synchronous wireless communication system is determined according to a wireless communication system identifier contained in the call setup request message.

10. The base station of claim 9, wherein, when the wireless communication system identifier contained in the call setup request message is different from the identifier of a synchronous wireless communication system to which the call setup request message is forwarded by the MME, a pre-registration procedure and call setup procedure are performed in sequence for the terminal.

11. The base station of claim 9, wherein, when the wireless communication system identifier contained in the call setup request message is equal to the identifier of a synchronous wireless communication system to which the call setup request message is forwarded by the MME, a call setup procedure is performed for the terminal.

12. The base station of claim 7, wherein the asynchronous wireless communication system comprises a Long Term Evolution (LTE) system and the synchronous wireless communication system comprises a High Rate Packet Data (HRPD) system.

* * * * *